Sept. 26, 1961 — R. ROWE — 3,002,042

ELECTRIC ACCUMULATOR

Filed July 23, 1958 — 3 Sheets-Sheet 1

INVENTOR
ROBERT ROWE
BY Paul M. Craig, Jr.
ATTORNEY

Sept. 26, 1961  R. ROWE  3,002,042
ELECTRIC ACCUMULATOR
Filed July 23, 1958  3 Sheets-Sheet 2
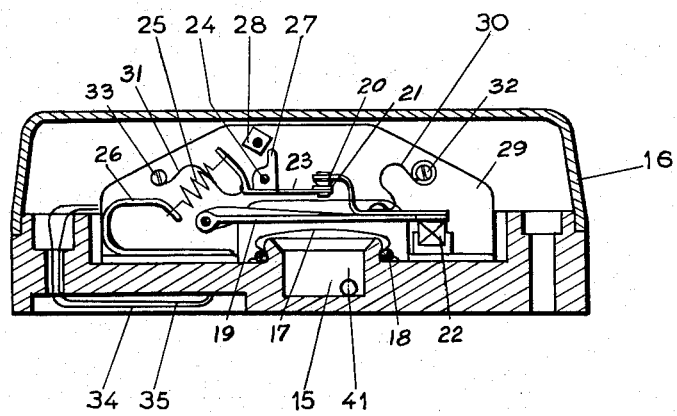
FIG: 3
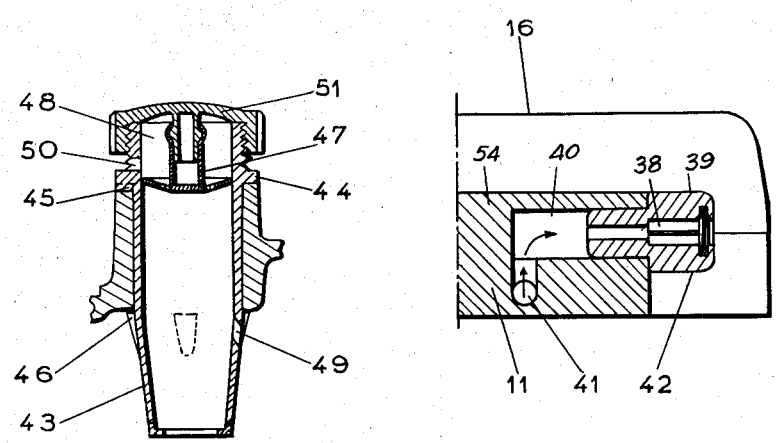
FIG: 5  FIG: 4
INVENTOR
ROBERT ROWE
BY Paul M. Craig, Jr.
ATTORNEY Sept. 26, 1961  R. ROWE  3,002,042
ELECTRIC ACCUMULATOR Filed July 23, 1958  3 Sheets-Sheet 3

INVENTOR
ROBERT ROWE
BY Paul M. Craig, Jr.
ATTORNEY 3,002,042
ELECTRIC ACCUMULATOR
Robert Rowe, Paris, France, assignor to Societe de l'Accumulateur Fulmen, Clichy, France, a corporation of France
Filed July 23, 1958, Ser. No. 750,474
Claims priority, application France Aug. 5, 1957
20 Claims. (Cl. 136—181)

The present invention concerns an electric accumulator or an accumulator battery in which is incorporated a charge regulator utilising the gas evolved by the accumulator.

Regulating devices are already known, in which the gas evolved by the cell is utilised to stop or limit the charging, so as to reduce this evolution, and then to restore the charging when the evolution of gas has decreased sufficiently, and so on, whereby it is possible to effect a complete regulation of the charging.

In order that such a regulator may operate under good conditions, it is important notably that the following principles be observed:

The battery-regulator system must be absolutely appropriate to the electrical equipment, notably if the current source is an alternator. The battery-regulator system must be such that all the movable parts, for example the caps, may be interchanged without any resultant disadvantage. The level of the liquid in the element actuating the regulator must not be too high, so as not to cause any disturbance in operation.

It has already been proposed to dispose the regulator in a separate member. However, separate constructions do not fully ensure that the aforesaid principles are observed.

The present invention relates to an accumulator battery comprising an element specially designed to actuate the regulator, the latter being connected to the said element and fixedly mounted on the battery, of which it forms an integral part.

The cover of the special element comprises the gas intake which ensures operation of the regulator.

The filling tube of the element comprising the regulator descends to the desired level, whereby the level is fixed during the filling operations, as will hereinafter be seen.

The breathing system of the other elements is included in the fixed part, so that the caps of the elements are imperforate and identical.

According to a variant of the invention, the charge regulating device is contained within the cap of one element, the regulator device being disposed in a cavity formed in or above the body of the cap and closed by a cover, the body of the cap forming a duct which connects the cavity with that part of the cap which is fitted on the cell, so as to afford communication between the cavity in the cap and the interior of the cell, the resilient chamber of the regulator being fitted to the end of the duct connecting it with the cell, and a calibrated gas discharge tube being disposed in a cavity in the cap, which is connected on one side with the duct leading to the cell and on the other side with the ambient medium.

The resilient diaphragm subjected to the pressure of the gases urges a lever, on which there is mounted an electric contact disposed in the circuit to be controlled, in the direction for opening the said contact, a magnet being provided to act on the said lever for closing the electric contact, while a spring device is provided to act on the fixed contact in order to ensure an adjustable and substantially constant pressure.

The spring device acting on the fixed contact consists of a lever supporting the fixed contact, which lever is pivotally mounted and returned by a spring, and an abutment limiting the travel of the contact-carrying lever.

The calibrated gas discharge tube is disposed in a detachable member.

The calibrated gas discharge tube comprises an anti-freezing heating device.

The chamber subjected to the pressure of the gases comprises a deformable diaphragm fixed on the body of the chamber by a resilient member to form a safety valve.

The features and advantages of the present invention will be more clearly apparent from the description given in the following with reference to the figures of the accompanying drawings, which show by way of example two constructional forms of the device according to the invention.

FIGURES 3 and 4 show diagrammatically the internal parts of the regulator.

FIGURE 5 illustrates the tube for filling the ordinary elements.

Figure 1:
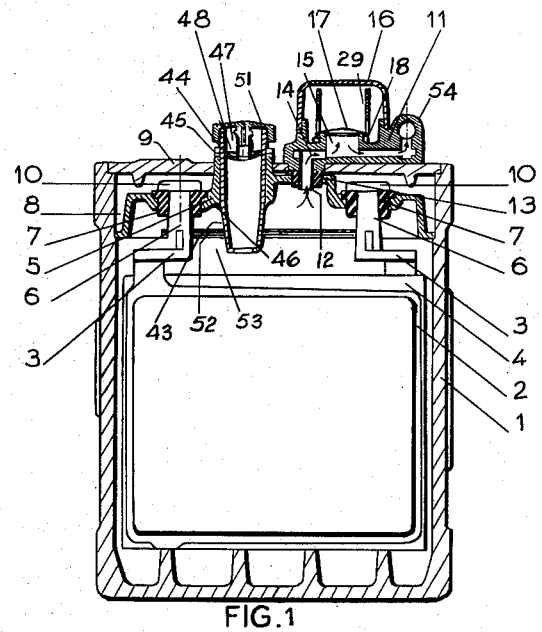
FIGURE 1 is a sectional view of the special element on which is mounted the regulator, the internal parts of which are only partly shown.

The element illustrated in FIGURE 1 comprises a container 1 containing plates 2 connected by junction bars 3 and separated by separators 4. The element is closed by a cover 5 specially adapted to the element and formed with an orifice permitting the gas intake hereinafter described. The barrel portions 6 of the junction bars extend through the cover by way of a packing device, for example a rubber washer 7 or any other appropriate means. The cover is luted on the container in the conventional manner by a compound 8. A general cover 9 is fitted over the battery and covers the compound 8 and the connections 10.

The body of the regulator 11 is fixed on the said general cover 9 by appropriate means, and communicates with the chamber of the element through a tube 12 which extends through the cover 5 by way of a packing device, such as a rubber washer 13. The tube 12 extends through a duct 14 to a chamber 15. The tube 12 is offset in relation to the chamber 15 to prevent liquid from being splashed into the said chamber. The regulating device is closed by a cap 16 which permits inspection of the internal parts of the regulator.

FIGURES 3 and 4 show the internal parts of the regulator. The chamber 15 is closed by a diaphragm 17 which may be either resilient or simply deformable. The diaphragm 17 is maintained on the flange of the chamber 15 by a resilient ring 18 which grips the periphery of the diaphragm on the flange. This arrangement ensures fluid-tightness of the chamber 15 as long as the operation is normal, but permits leakages in the case of an accidental excessive pressure, thus constituting a safety valve.

The pressure of the gases on the diaphragm 15 lifts a lever 19 on which there is mounted a movable contact 20 associated with a fixed contact 21. A magnet 22 acts on the end of the contact-carrying lever 19 in the direction for closing the electric contact 20. The open or closed position of the movable contact 20 is adjusted by the position of the diaphragm 17.

On the other hand, the fixed contact 21 is mounted on a lever 23 rocking about a pin 24 which is maintained, in the closed position, against the movable contact 20 by a coil spring 25, the pressure of which is adjustable by appropriate means. In FIGURE 3, the said means consist of bending to the required extent of the member 26 to which the spring 25 is secured. This device maintains a substantially constant contact pressure. A finger 27 fast with the lever 23 abuts an adjustable stop 28 so as to limit the rocking of the lever 23. Thus, when the diaphragm 17 is lifted by the evolution of gas, the contact 21 cannot remain against the contact 20 and the circuit is opened. These various members are mounted between two cheeks 29 fixed to the body of the regulator.

The combined action of the permanent magnet on the contact-carrying lever and of the spring device 25 acting on the fixed contact to produce an adjustable and substantially constant contact pressure ensures clean opening and closing of the controlled electric circuit.

The arrangement of FIGURE 3 is particularly advantageous for two further reasons:

By reason of the position of the movable contact 20 on its lever, the contact pressure is clearly greater than the attractive force of the magnet in the closed position.

The slight tangential displacement at the instant of the contact produces a self-cleaning action which ensures that the contacts remain clean.

Figure 2:
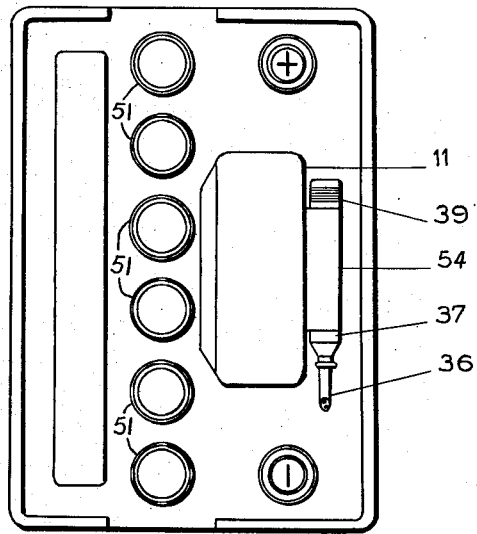
FIGURE 2 is a plan view showing an arrangement of the regulator on the battery.

The two contacts 20 and 21 are connected respectively by flexible conductors 30 and 31 to the terminals 32 and 33. Secured to the said terminals are the wires 34 and 35 of the double conductor 36, which extends from the regulator through the duct 37 (FIGURE 2). The electric circuit may comprise in addition relays or resistances which may be grouped within the regulator space.

The device according to the FIGURES 3 and 4 comprises in addition a short calibrated gas discharge tube 38 which is mounted in a readily removable member 39, which is disposed in a chamber 40 communicating on one side with the chamber 15 through a duct 41 and on the opposite side with the ambient medium through the calibrated tube 38 and a filter 42. The calibrated tube 38 determines the limit of the stroke of the regulator, and also the duration of the contact times in relation to the inoperative times and thus fixes the true rate of charge.

In the illustration of FIGURES 1 and 5, the filling tube 43 is a separate part. It may also be moulded in one piece with the cover. FIGURE 5 shows the details of the filling tube for the ordinary elements. The tube 43 consists of a moulded material, such as polythene. It is press-fitted in the cover 5. The extent to which the tube descends is limited by a flange 44. A stud 45 is disposed in a recess in the cover 5 and prevents rotation of the tube. At the end of the travel, studs 46 compressed during the introduction of the tube return to their normal position and abut the cover 5, thus preventing the tube from rising again. The tube 43 is closed at its upper end by a cap 51, which supports a deflecting device 47 fixed on a central extension of the cap. The said deflecting device has the object of preventing drops of liquid from falling and of facilitating the descent into the element of any drops of liquid which have penetrated into the upper chamber 48 of the tube 43. The cap 51 is fluid-tight and is fixed on the tube 43 by screwing or other appropriate means. The tube 43 is formed with two or more orifices 49 and 50 through which the element in question breathes, even when the imperforate cap is tightly screwed.

FIGURE 1 illustrates the filling tube 43 of the special element actuating the regulator. The said tube differs from that employed in the ordinary elements hereinbefore described in that the orifices 49 and 50 are lacking. Mounted on the said tube is an imperforate cap 51 identical to that of the other elements. Therefore the caps may without disadvantage be interchanged during the topping-up with water.

The element may comprise a deflector 52.

The filling or topping-up of the special element is effected in the following manner: The cap 51 is unscrewed and electrolyte or water is poured in as usual. When the level in the element reaches the bottom of the tube 43, the filling is stopped. The single orifice for the escape of the air trapped under the cover is the calibrated tube. If the filling continues, this escape is sufficiently slow to enable the tube 43 to be entirely filled. As the excess of air escapes through the calibrated tube, the liquid in the tube descends and finally settles in the element at the predetermined level 53. Therefore, there is no danger of overfilling.

FIGURE 2 is a plan view of a battery on which the regulator 11 is mounted. The said regulator comprises a boss 54. Disposed at one end of the boss is the member 39 containing the calibrated tube 38. At the other end, the conductor 36 connecting the regulator to the external electric circuit extends through the duct 37.

It is conceivable that more than one regulator may be provided to each battery, each regulator being mounted on a special element in the manner of the described regulator.

Figure 6:
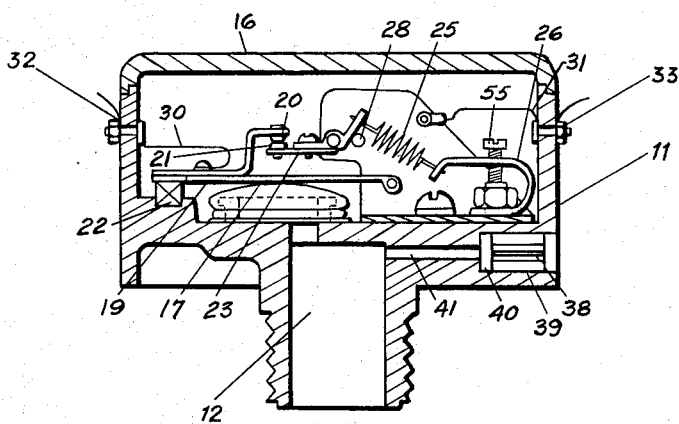
FIGURE 6 illustrates diagrammatically a cap comprising a regulating device according to the invention.

The cap illustrated in FIGURE 6 comprises a body 11 and a cover 16. A deformable diaphragm 17 receives the gases from the electrolytic cell through the channel 12. The pressure of the gases on the diaphragm lifts a lever 19 on which is mounted a movable contact 20 associated with a fixed contact 21. A magnet 22 urges the end of the contact carrying lever 19 in the direction for closing the electric contact 20. The open or closed position of the movable contact 20 is adjusted by the position of the diaphragm 17.

On the other hand, the fixed contact 21 is mounted on a lever 23 which is maintained, in the closed position, against the movable contact 20 by a coil spring 25, the pressure of which is adjustable by appropriate means. In FIGURE 6, the said means consists of the bending, under the action of a screw 55, of the member 26 to which the spring 25 is attached. This device maintains a substantially constant contact pressure. An abutment 28 limits the rocking of the lever 23, so that when the evolved gas lifts the diaphragm 17, the contact 21 cannot remain against the contact 20 and the circuit is broken.

The combined action of the permanent magnet on the contact-carrying lever and of the spring device 25 acting on the fixed contact to produce an adjustable and substantially constant contact pressure ensures clean opening and closing of the controlled electric circuit.

The two contacts 20 and 21 are connected respectively by flexible conductors 30 and 31 to the terminals 32 and 33. The electric contact may comprise in addition relays or resistances which may be disposed within the cap.

The device of FIGURE 6 comprises in addition a calibrated gas discharge tube mounted in a readily removable member 39 which is disposed in a chamber 40 communicating on one side with the chamber 12 through a duct 41 and on the opposite side with the ambient medium. The calibrated tube 38 determines the limit of travel of the regulator, as also the length of the contact times in relation to the inoperative times and thus fixes the true rate of charge.

Figures 7, 8:
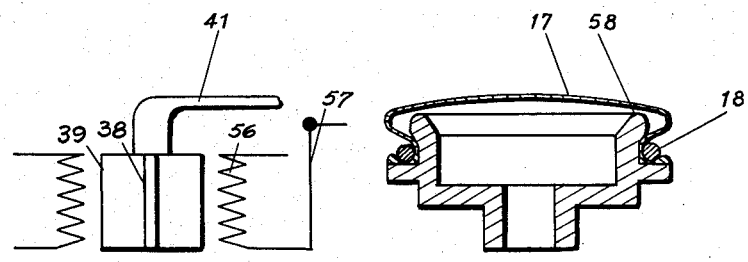
FIGURE 7 illustrates diagrammatically the anti-freezing heating device.
FIGURE 8 is a sectional view of the deformable chamber.

In the device illustrated diagrammatically in FIGURE 7, the calibrated tube 38 comprises an anti-freezing device consisting of an electric conductor 56 disposed in the charging circuit 57 and situated in proximity to the tube-supporting member 39, so as to prevent any condensation or freezing of the vapours emitted by the capillary tube 38 in very cold weather.

FIGURE 8 shows the details of the construction of the resilient chamber. The resilient diaphragm 17 is maintained on the flange 58 of the chamber by a resilient ring 18 which grips the periphery of the diaphragm on the flange 58. This arrangement ensures fluid-tightness of the diaphragm 17 as long as the operation is normal, but permits leakages in the event of an accidental pressure increase, thus constituting a safety valve.

The gas evolved by a plurality of elements, or by the whole battery, may be collected to control a common regulator.

If one regulator per element is employed, the first regulator may be arranged to control the connection of a first resistance into the charging circuit and its disconnection therefrom, the second regulator may be arranged to control the connection and disconnection of a second resistance, and so on in the case of the other regulators.

I claim:

1. An electric accumulator comprising at least one cell having a cover and charge-regulating means associated therewith, the charge-regulating means being actuated by the pressure of the gases evolved by the cell, and comprising a body defining a chamber subjected to the pressure of the gases, the entire regulating means being secured to the cover of the cell, the regulating means further comprising a gas inlet duct in the cover of the cell of the accumulator and connecting the interior of the accumulator with the chamber of the regulating means which is subjected to the pressure of the gases, means comprising a calibrated gas discharge tube being disposed in the body of the regulating means forming a communication between the said chamber and the ambient medium, normally closed contact means for controlling the charging of the accumulator, means disposed within a cover cavity and acting as a function of the pressure of the evolution of gas to actuate said contact means, and return means returning the contact means to their normal position.

2. An accumulator according to claim 1, wherein the regulating means are incorporated in the cover and form an integral part thereof, the cover being formed with a recess in which there is fitted the duct of the regulating means which is intended to collect the gases, a removable fluid-tight filler cap separate from the regulating means and closing the accumulator cell which is associated with the regulating means.

3. An accumulator according to claim 2, wherein the regulating means are fixed to a general cover covering the whole accumulator.

4. An accumulator according to claim 2, wherein the cover of the cell connected to the regulating means comprises a gas intake through which there passes, by way of a fluid-tight passage, the duct connecting the chamber subjected to the pressure with the interior of the accumulator.

5. An accumulator according to claim 1, wherein the regulating means are grouped in a cap forming at least part of the cover of the cell and in a first cavity formed in the cap and closed by a second cover, the body of the cap comprising said chamber and the gas inlet duct which connects the chamber with an external part of the cap which communicates with the interior of the cell, said chamber being deformable and fitted to the end of the gas inlet duct, the calibrated discharge tube being disposed in a second cavity in the cap, the second cavity communicating on one side with the gas inlet duct and on the other side with the ambient medium.

6. An accumulator according to claim 2, wherein the axis of the duct for the passage of the gases is offset in relation to the axis of the chamber of the regulating means which is subjected to the pressure of the gases.

7. An accumulator according to claim 1, wherein the contact means comprise a movable contact and a fixed contact and spring means acting on the fixed contact to produce a substantially constant contact pressure.

8. An accumulator according to claim 7, wherein the pressure of the spring means is adjustable.

9. An accumulator according to claim 7, wherein the spring means acting on the fixed contact consists of a lever supporting the fixed contact and pivoted about a pin by a spring, and abutment means limiting the stroke of the contact-carrying lever.

10. An accumulator according to claim 2, wherein the calibrated gas discharge tube is disposed in a readily removable member.

11. An accumulator according to claim 1, wherein the calibrated gas discharge tube comprises heating means forming an anti-freezing device for the discharge gases.

12. An accumulator according to claim 1, wherein the chamber subjected to the pressure of the gases comprises a deformable diaphragm and elastic means for fixing the diaphragm on the body of the chamber in such manner as to form a safety valve.

13. An accumulator according to claim 12, wherein the deformable diaphragm is a resilient diaphragm.

14. An accumulator according to claim 1, including a filling tube for each cell and wherein the filling tube of the cell connected to the regulating means comprises only one cover closed by a filling cap and extending down into the cell in such manner as to determine the level of the liquid in the filling or topping-up with water.

15. An accumulator according to claim 14, wherein the filling tube is moulded in one piece with the cover.

16. An accumulator according to claim 14, wherein means are provided to limit the upward and downward movement of the filling tube consisting of a part of the cover, and means are provided to prevent its rotation.

17. An accumulator according to claim 2, including a plurality of cells each having a filling tube and wherein the filling tubes of the other cells are formed with the apertures necessary for the breathing of the cells, the filling caps being imperforate and identical in all the cells.

18. An accumulator according to claim 1, wherein the return means returning the contact means to their normal position comprise a permanent magnet.

19. An accumulator according to claim 1, wherein the means acting as a function of the pressure of the gases consist of a diaphragm subjected to the action of the evolved gases and of a lever supporting a contact and bearing on the diaphragm.

20. An accumulator according to claim 19, wherein the means subjected to the gas pressure act in the sense of contact-interruption upon an increase in gas pressure.

References Cited in the file of this patent

UNITED STATES PATENTS

| | | |
|---|---|---|
| 1,034,108 | Halbleib | July 30, 1912 |
| 1,983,243 | Rose et al. | Dec. 4, 1934 |
| 2,004,767 | Prince | June 11, 1935 |
| 2,204,101 | Rumagalli | June 11, 1940 |